Feb. 20, 1934.  L. A. GUMPORT  1,948,172
MANUFACTURE OF FOUR-IN-HAND NECKTIES
Filed Aug. 24, 1931
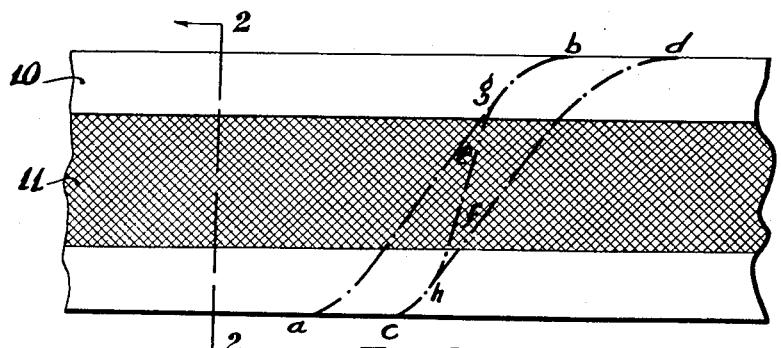 
Fig. 1  Fig. 2
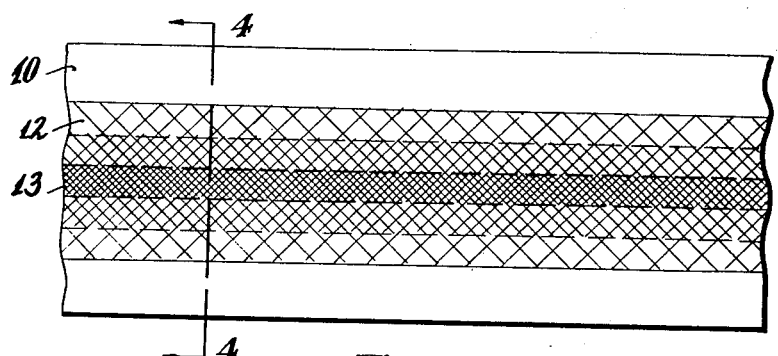 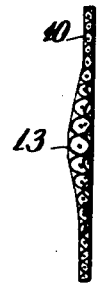
Fig. 3  Fig. 4
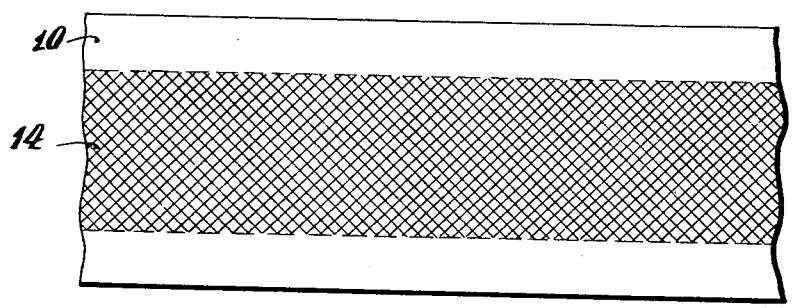
Fig. 5
INVENTOR
Leonard A. Gumport
BY
ATTORNEY Patented Feb. 20, 1934

1,948,172

UNITED STATES PATENT OFFICE 1,948,172

MANUFACTURE OF FOUR-IN-HAND NECKTIES

Leonard A. Gumport, New York, N. Y.

Application August 24, 1931. Serial No. 558,880

1 Claim. (Cl. 2—146)

This invention relates to new and useful improvements in a method for manufacturing the pieces for use in the manufacture of four-in-hand neckties.

The invention has for an object the construction of material for the manufacture of the pieces of a necktie which is characterized by a strip with a thickened or reinforced center portion which allows the production of a necktie which is reinforced around the band and knot and that portion of a tie just below the knot portion of the tie only.

Another one of the objects of this invention is the construction of the reinforced portion of the strip constructed by interweaving wool warp, wool filling, plain silk warp or silk, or other similar materials.

Furthermore, it is proposed to construct the reinforced portion in the form of tapered sides so as to supply the greatest thickness with the least amount of material, thereby eliminating the need of an interlining.

Furthermore, the invention has for an object the placing of adhesive material along the strip to constitute the reinforced part.

A still further object of this invention is the construction of material which is used in the manufacture of pieces to be used in the manufacture of four-in-hand ties, and a process for obtaining the same, which is of simple design and which can be carried out and used without excessive expense.

For further comprehension of the invention, and of the objects and advantages thereof, reference will be had to the following description and accompanying drawing, and to the appended claim.

In the accompanying drawing forming a material part of this disclosure:—

Fig. 1 is a strip of material constructed according to this invention and illustrated with guide lines to direct the cutting of the pattern pieces for the manufacture of the tie.

Fig. 2 is a transverse sectional view taken on the line 2—2 of Fig. 1.

Fig. 3 is a view similar to Fig. 1 but illustrating a modification.

Fig. 4 is a sectional view taken on the line 4—4 of Fig. 3.

Fig. 5 is another view similar to Fig. 1 but illustrating another modification.

The method for manufacturing the pieces for use in the manufacture of four-in-hand neckties, comprises forming a strip of fabric 10, weaving upon one side thereof a relatively narrow strip 11 of wool warp, wool filling, cotton, rayon, plain silk warp or silk along the longitudinal central portion along the back of said fabric, cutting said strips generally transversely to form a portion the outline of which conforms to the contour produced by placing the two pieces of a conventional four-in-hand tie pattern end to end in such a manner that the tapered edge of each pointed end is adjacent each other.

On the drawing, the lines $ab$ and $cd$ bound the cutting of the two pieces of a conventional four-in-hand pattern so that the points $e$ and $f$ are end to end and adjacent each other. The invention proposes that the lines $ab$ and $cd$ be generally diagonal. It is proposed that near its central part this area be divided by line $gh$ to form the two pieces of a conventional four-in-hand tie pattern. The line $gh$ is approximately between the opposite edges of the aforementioned reinforced portion 11 so that the neck and adjacent portion of the finished tie will be reinforced on the back of the fabric at the portion which encircles the neck, knot and the part just below the knot. When thus constructed the front of the tie, namely the pointed end portions, will be free of any reinforcement so as to be very flexible and present the appearance of a well-tailored tie, and eliminate the necessity of having an interlining.

In Figs. 3 and 4, a modification of the invention has been disclosed in which a strip 10 has woven thereon a reinforcement portion 12 which has its central longitudinal line 13 elevated and which slopes from this line downwards until it meets the face of the strip 10. This is very clearly shown in Fig. 4. The strip of material thus constructed should be cut to form the piece for the four-in-hand tie as instructed relative to Figs. 1 and 2.

In Fig. 5 another modification of the invention has been disclosed in which a strip 10 has a central reinforcement portion 14 applied adhesively in the form of rubber. This strip should also be cut as directed in Fig. 1 for the obtaining of the pieces for the manufacture of the four-in-hand tie.

A tie constructed according to this method will have its band and knot and that portion just below the knot portion automatically reinforced so that it is strong at the portion where it has the greatest wear. The reinforcement is obtained without the aid of lining material. Furthermore, no appreciable additional expense is entailed in the manufacture of ties constructed according to this invention as distinguished from ties manufactured at the present time. The use of the pattern pieces, furthermore is such that there is absolutely no waste of material during the cutting of the pieces.

While I have shown and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:—

A method of manufacturing the pieces of a four-in-hand necktie comprising forming a strip of fabric, weaving upon one side of said strip a relatively narrow reinforcement panel, thickening the central longitudinal line of said panel and decreasing the thickness of the portions of the panel on both sides of the thickened portion so that the surface of the panel slopes from the central line until it meets the face of the strip, cutting the assembled strip and panel generally transversely to form a piece the outline of which conforms to the contour produced by placing the two pieces of a conventional four-in-hand tie pattern end to end in such a manner that the tapered edge of each pointed end is adjacent the other, and cutting this piece on a diagonal line between the opposite edges of the reinforcement panel so that the neck and adjacent portion of the finished tie will be reinforced on the back of the fabric at the neckband, knot, and portion just below the knot with a reinforcement tapering in thickness to its end edges.

LEONARD A. GUMPORT.